(12) United States Patent
MacNeil et al.

(10) Patent No.: US 9,775,326 B1
(45) Date of Patent: Oct. 3, 2017

(54) PET RAMP SYSTEM

(71) Applicant: MacNeil IP LLC, Bolingbrook, IL (US)

(72) Inventors: David F. MacNeil, Hinsdale, IL (US); Frederick W. Masanek, Jr., Barrington, IL (US); David S. Iverson, Hinsdale, IL (US)

(73) Assignee: MacNeil IP LLC, Bolingbrook, IL (US)

( * ) Notice: Subject to any disclaimer, the term of this patent is extended or adjusted under 35 U.S.C. 154(b) by 0 days.

(21) Appl. No.: 15/090,321

(22) Filed: Apr. 4, 2016

(51) Int. Cl.
*A01K 1/035* (2006.01)
*B65G 69/30* (2006.01)
*A01K 29/00* (2006.01)
*A01K 3/00* (2006.01)

(52) U.S. Cl.
CPC ............... *A01K 1/035* (2013.01); *A01K 3/00* (2013.01); *A01K 29/00* (2013.01); *B65G 69/30* (2013.01)

(58) Field of Classification Search
CPC ...... A01K 1/035; A01K 29/00; B65G 41/001; B65G 41/002; B65G 69/2811; B65G 69/30
USPC ........... 119/712, 753, 843, 847–849; 52/848, 52/182, 183; 14/69.5, 71.1; 414/469, 414/474, 476, 537
See application file for complete search history.

(56) References Cited

U.S. PATENT DOCUMENTS

| | | | |
|---|---|---|---|
| 449,228 A | 3/1891 | Myers et al. | |
| 788,424 A | 4/1905 | Ochs | |
| 850,640 A | 4/1907 | Gibson | |
| 1,733,517 A | 10/1929 | Siddens | |
| 2,597,213 A * | 5/1952 | Whiteman | B65G 69/30 14/72.5 |
| 3,735,440 A * | 5/1973 | Hetmanski | E01D 15/24 14/71.1 |
| 5,566,622 A * | 10/1996 | Ziaylek, Jr. | A62C 33/06 104/275 |
| 6,107,575 A * | 8/2000 | Miranda | H02G 3/0437 174/101 |
| 6,119,634 A | 9/2000 | Myrick | |
| 6,389,629 B1 * | 5/2002 | Schouest | B60P 1/43 119/849 |
| 6,886,660 B2 | 5/2005 | Sapatova | |

(Continued)

FOREIGN PATENT DOCUMENTS

FR         1424944 A  *  1/1966  ............ B65G 69/30

OTHER PUBLICATIONS

"Paw Climbers Pet Ramp," available at www.sears.com/paw-climbers-pet-ramp-for-beds/p-SPM9589744625 (first published Sep. 11, 2014).*

(Continued)

*Primary Examiner* — Lisa Tsang
(74) *Attorney, Agent, or Firm* — Perkins IP Law Group LLC; Jefferson Perkins

(57) ABSTRACT

A pet ramp system has a central pier and at least one ramp with an axle that is received in an axle receiver disposed near the top of the pier. The axle is disposed inwardly, in both a fore and aft direction and in a transverse direction, from a base perimeter of the pier. The pier's axle receiver(s) permit installation of the ramp axle when the ramp is in a vertical orientation, but the receiver(s) will not permit separation of the ramp from the pier when in use.

12 Claims, 11 Drawing Sheets

(56) References Cited

U.S. PATENT DOCUMENTS

| | | | |
|---|---|---|---|
| 7,013,530 B2 * | 3/2006 | Lallemant | G06F 1/1616 16/260 |
| 7,309,836 B2 * | 12/2007 | Lubanski | H02G 3/0418 104/275 |
| 8,146,941 B2 * | 4/2012 | Steins | B62D 63/061 14/71.1 |
| 2015/0007415 A1 * | 1/2015 | Kalinowski | E05D 11/1007 16/319 |

OTHER PUBLICATIONS

English-language translation of FR 1424944.*

* cited by examiner

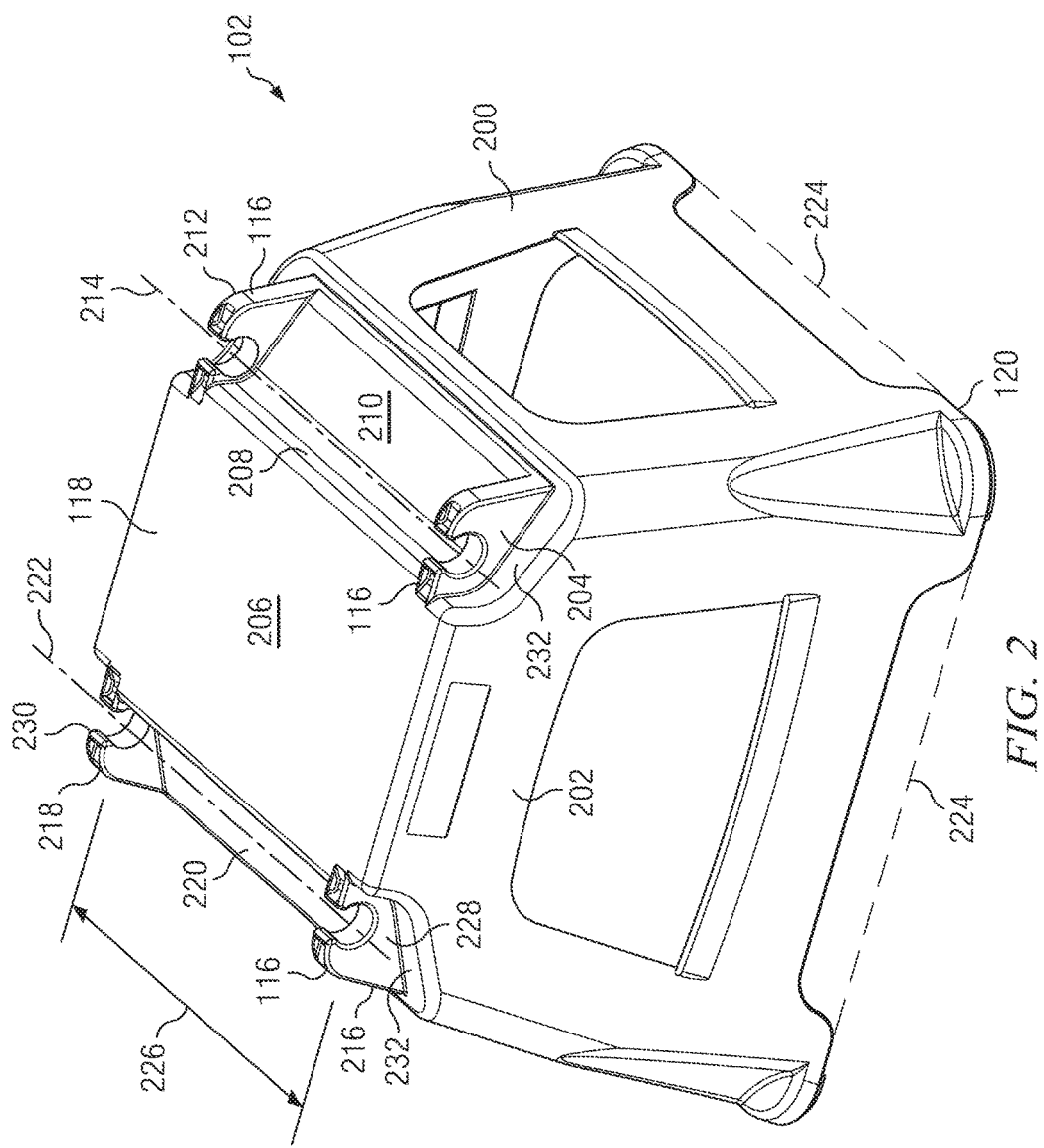
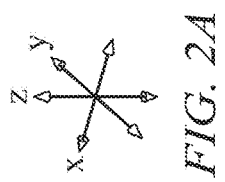

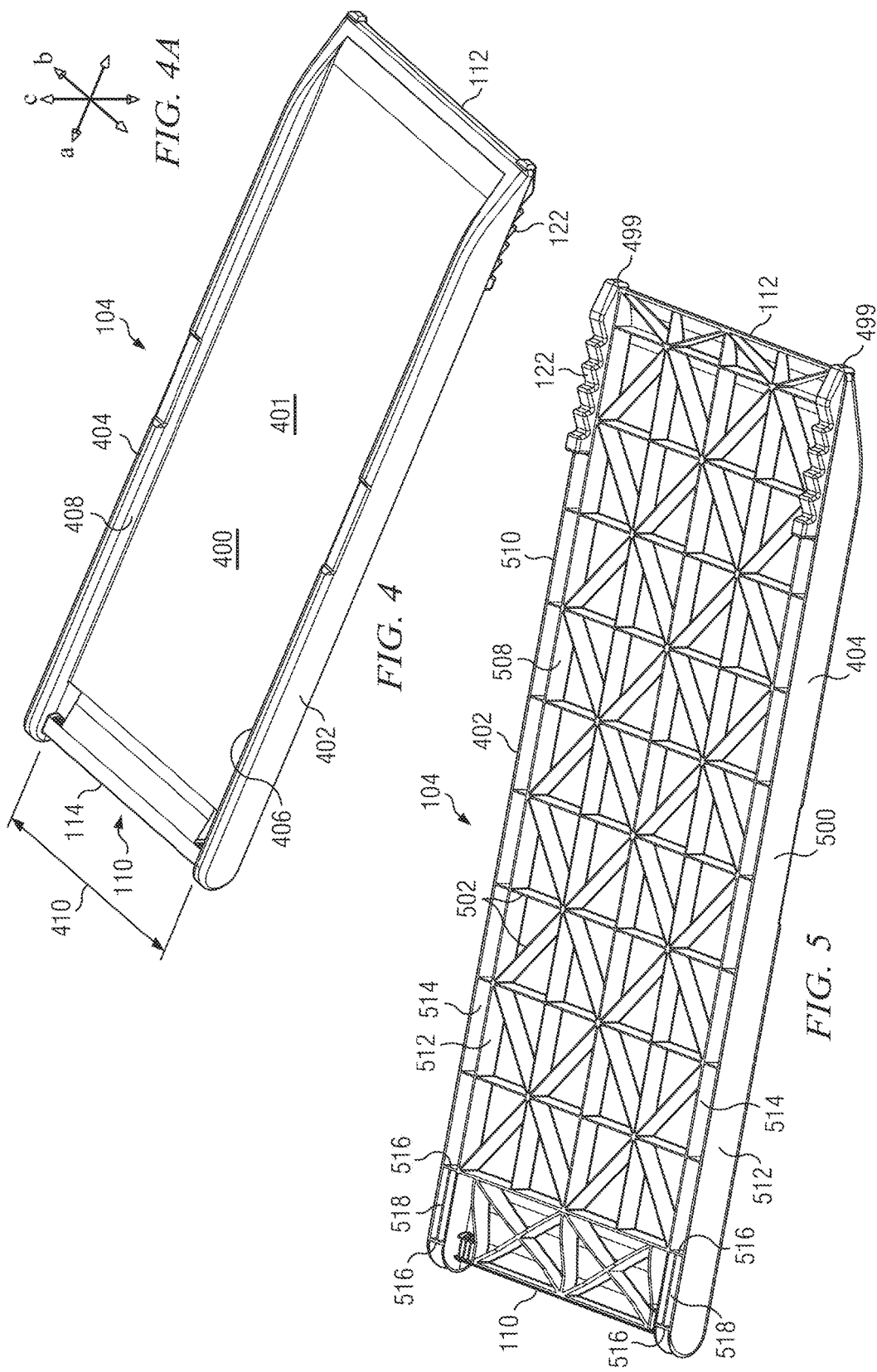

PET RAMP SYSTEM

BACKGROUND OF THE INVENTION

In recent times attention has been paid to assisting elderly, heavier or disabled pets, particularly dogs, into motor vehicles. A van or an SUV may have a hatch sill that is 30 inches or more from the ground. A single-span pet ramp into the hatch must therefore either be placed at a steep angle, such as 30 degrees, or must be inordinately long. The steeper the ramp, the more difficulty that an older, heavier or disabled dog will have in using it in entering and exiting the vehicle. Also, extending the length of a single-span ramp produces issues relating to the load that the span can carry and to its torsional stability. A need therefore exists for pet ramp systems that are easier and safer for pets to use.

SUMMARY OF THE INVENTION

The present invention provides a pet ramp system that has a pier and at least one ramp for articulable and removable attachment to the pier. The pier has at least one axle receiver disposed near its top. The pet ramp has an axle that is disposed at its near end. The axle receiver of the pier is adapted to receive the pet ramp axle. The axle receiver is so positioned that it is displaced longitudinally inwardly and transversely inwardly from a perimeter or footprint of the base of the pier. This gives the pet ramp system excellent load distribution characteristics and torsional stability.

In one embodiment the system further includes a second ramp. A second axle, disposed at a near end of the second ramp, may be received into at least one second axle receiver of the pier. The second axle receiver is formed near the top of the pier and to be longitudinally displaced from the first axle receiver. Like the first axle receiver, the second axle receiver is inwardly spaced, both in a longitudinal and in a transverse direction, from the perimeter of the pier base.

In one embodiment, the axle receiver is one of a pair of left and right axle receivers that are spaced apart from each other in a transverse direction. In one embodiment, the second axle receiver likewise is one of a pair of left and right axle receivers spaced apart from each other in a transverse direction. All such receivers are positioned to be transversely inboard from, and longitudinally inward from, the pier base perimeter.

According to another aspect of the invention, a pet ramp system has at least one ramp and a pier. As described using an abc set of axes or directions, where directions a, b and c are at right angles to each other, the ramp has a length in the a direction. A ramp axle is disposed at a near end of the ramp and to be aligned to the b direction. A thickness of the axle in the c direction is less than its thickness in the a direction.

The pier of this system may be described with a similar xyz system of axes or directions, with directions x, y and z being at right angles to each other. The pier has a length in the x direction, a width in the y direction, and a height in the z direction. At least one axle receiver is formed near the top of the pier. An upwardly facing opening of the axle receiver has a dimension in the x direction that is greater than the thickness of the ramp axle in the c direction, but is less than the thickness of the ramp axle in the a direction. The ramp axle may be inserted into the axle receiver when the a direction of the ramp is at least approximately aligned with the z direction of the pier; typically, the ramp is held vertically above the pier and the near end of the ramp is lowered until the axle passes through the opening in the axle receiver.

Once the axle is seated in the axle receiver (or, in the illustrated embodiment, each of a pair of spaced-apart axle receivers formed around the same axis), the ramp may be articulated around its axle and swung down to any of several positions. In one such position, the ramp is sloped upward from the pier to the vehicle bumper or hatch. In another such position, the ramp is swung downward until its far end is in contact with the ground. If the ramp's a direction or long axis is more than a predetermined angle from the pier's z direction, it will not be possible to remove the ramp axle from the axle receiver(s). In use, the attitude of the ramp relative to the pier is such that its direction a is always more than this angle away from pier direction z, preventing the separation of the ramp from the pier. In one embodiment, this predetermined angle is about 20 degrees. Where the pier is positioned on a horizontal surface, the predetermined angle will be about 20 degrees from the vertical.

The present invention provides a pet ramp system in which the ramps are sloped at an angle that is smaller than the angle assumed by conventional single-span pet ramps. For example, instead of a ramp angle of 30 degrees or more, the pet ramp system of the system can provide ramp angles of about 20 degrees. The central pier provides greatly enhanced stiffness, load capacity, torsional stability and resistance to shear forces of the type that may be generated by a large dog. In one embodiment, two identical ramps are provided and either may be fitted into either set of axle receivers, making assembly and disassembly easy and foolproof. Nonetheless, the three system components will not separate from each other during use.

BRIEF DESCRIPTION OF THE DRAWINGS

Further aspects of the invention and their advantages can be discerned in the following detailed description, in which like characters denote like parts and in which:

FIG. 2 is a perspective top view of a pier for use with the system illustrated in FIG. 1;

FIG. 2A depicts a frame of reference used to describe the pier shown in FIG. 2;

FIG. 4 is a top perspective view of a ramp for use with the system illustrated in FIG. 1;

FIG. 4A depicts a frame of reference used to describe the ramp shown in FIG. 4;

FIG. 5 is a bottom perspective view of the ramp illustrated in FIG. 4;

DETAILED DESCRIPTION

Figure 1:
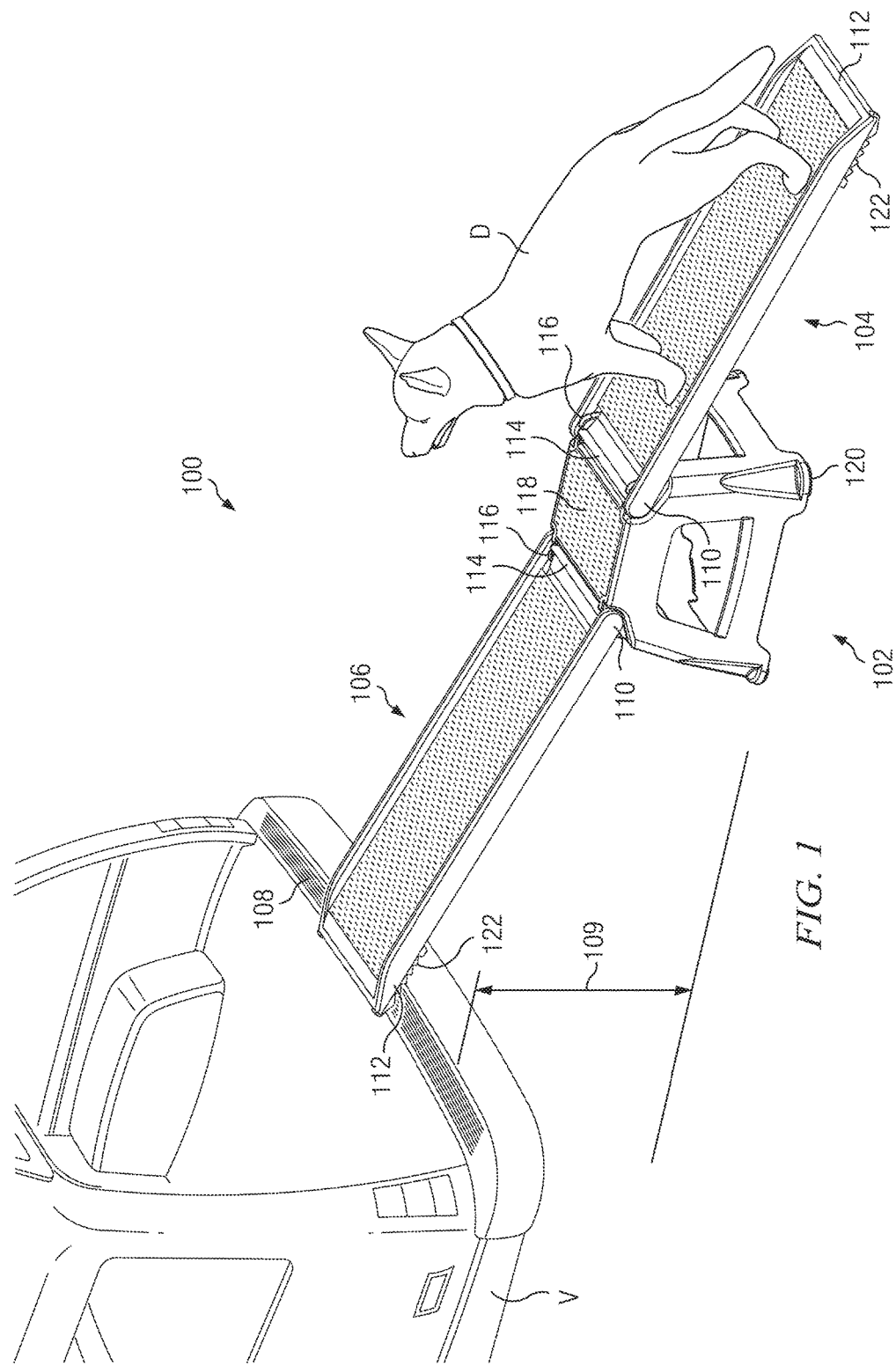
FIG. 1 is a perspective view of an assembled pet ramp system according to one embodiment of the invention, shown deployed to provide a pathway for a dog into a cargo area of a vehicle.

A pet ramp system, indicated generally at 100 in FIG. 1, has in this illustrated embodiment a central pier 102, a first ramp 104, and a second ramp 106. The ramp system 100 has been assembled to permit a dog D to easily walk up ramps 104, 106 and into the cargo area of a vehicle V.

As assembled, the pet ramp system 100 has an overall grade or slope that is substantially gentler than would be required by a conventional pet ramp leading up to a height 109 of a cargo area sill, surface or interior 108 of vehicle V, which often can be 30 inches or more. To attain this height, conventional pet ramps have to be disposed at slopes of as much as 30 degrees, making their ascent by an older or heavier dog D difficult. A single-span pet ramp could simply be made longer to resolve this problem, but then another one is encountered: the ramp has to be stiff enough to bear the load of dog D without much flexing and with torsional stability. These problems get worse as the total span increases.

These problems are resolved by providing two ramps 104, 106 as articulated to the central pier 102. As assembled, the pet ramp system 100 affords a more gentle and easily negotiated slope to dog D, such as 19 or 20 degrees. The pier 102 greatly increases stiffness and torsional stability of the system 100.

In the illustrated embodiment, two ramps 104 and 106 are provided. In other embodiments, first ramp 104 could be replaced with a set of steps that could be integrally formed as a part of pier 102. In the illustrated embodiment, ramps 104 and 106 are interchangeable and, more particularly, identical; this aids in system assembly, as either ramp 104, 106 may be assembled to either set of axle receivers (described below) of the pier 102. In other embodiments the ramps 104, 106 could intentionally be provided in different lengths.

Each ramp 104, 106 has a near end 110 that is spaced in a longitudinal direction from an opposed, far end 112. The near ends 110 are each equipped with at least one axle 114 that is assembled to at least one, and preferably to a respective pair, of axle receivers 116 (described in more detail below) disposed at or near a top 118 of the pier 102. Ramps 104 and 106 may be freely turned about their respective axles 114 for a large arc that includes a vertical position, a horizontal position, and various inclined positions including the two positions shown in FIG. 1. In use, the far end 112 of first ramp 104 typically is dropped to the ground. The far end 112 of the second ramp 106 is placed on a hatch sill, bumper or other suitable surface 108 in or adjacent to the interior of vehicle V.

The top 118 of the pier 102 is displaced from a base 120 of the pier 102 by a height that is preselected to be lower than vehicle cargo sill height 109. For example, the height of top 118 may be about half the vehicle cargo sill height, or about fifteen inches. The height of pier 102 could be altered according to the vehicle with which the system 100 is designed to be used; several piers 102 could be separately sold in assorted sizes, for use with ramps 104, 106 of a single length or of other assorted lengths. Each far end 112 may be provided with a gripping foot 122 to increase friction with the ground and with a receiving surface 108 of the vehicle V.

More detail of a pier 102 according to the invention is shown in FIG. 2. FIG. 2A illustrates a frame of reference used to describe pier 102. An x direction or axis is a fore-and-aft, longitudinal or length direction of the pier 102, is horizontal, and typically in use is aligned with the axis of the vehicle in connection with which the system 100 is used. The y direction or axis is transverse, or inboard-outboard, is horizontal, and is at 90 degrees to the x direction. The z direction or axis is aligned to the vertical and is at ninety degrees to both x and y.

In the illustrated embodiment, the pier 102 is provided with two pairs of axle receivers 116. At or near a rearward wall 200 of the pier 102 and a leftward wall 202 of the pier 102, and near the top 118 of pier 102, there is provided a first (left rear) axle receiver 204. In this embodiment all of the axle receivers 116 take the form of relatively thin processes that upwardly extend from downwardly sloping surfaces of top 118. The top 118 of the pier 102 may have a flat surface 206 as shown. At its rearward edge, the surface 206 terminates in a downwardly extending wall 208. The height of wall 208 is selected to be similar to a thickness of ramp 104. Wall 208 in turn transitions through a concave curve to a downwardly and rearwardly sloped surface 210. The sloped surface 210 extends downwardly and rearwardly until it meets with rear pier wall 200. The angle of surface 210 should be sufficiently great that an end 112 of ramp 104 may rest on the ground at a location below that of base 120, such as five inches below the elevation of base 120, without the ramp being limited by surface 210 (see FIG. 6D). In one embodiment, and as shown in FIG. 6D, ramp 104 can assume an attitude of up to 27 degrees from the horizontal. This permits the use of system 100 on a hill where the elevation of the pier base 120 is higher than the point of contact of far end 112 of ramp 104 to the ground. If the ground beneath far end 112 and pier base 120 is at the same elevation, ramp 104 will be at about 20 degrees from the horizontal and in one embodiment would be 19 degrees from the horizontal.

In the illustrated embodiment, the receivers 116 are provided in pairs. The rear axle receivers 204, 212 have upwardly facing curved bearing surfaces (described below) that are formed as surfaces of rotation around a rear axis 214 that is at an angle to the x direction and preferably is aligned with the y direction. In alternative embodiments, one or more further, relatively thin receivers could be formed to upwardly extend from spaced-part locations on sloped surface 210, in spaced relation between left rear receiver 204 and right rear receiver 212. A predetermined width 226 separates an outboard-facing surface 228 of receiver 216 from an outboard-facing surface 230 of receiver 218. A like width separates the outboard-facing surfaces 234, 236 (see FIG. 2B) of receiver pair 204, 212.

Pier 102 further has a front left receiver 216 and a front right receiver 218, both upstanding from a downwardly and forwardly sloping surface 220. In the illustrated embodiment, the receivers 216, 218 and sloped surface 220 are mirror images of receivers 204, 212 and sloped surface 210. This is so that either the front or the back of the pier 102 could be rearwardly positioned as assembled into the pet ramp system 102, aiding in ease of assembly. The axle receivers 216, 218 have upwardly facing curved bearing surfaces that are formed as surfaces of rotation around a front axis 222. Front axis 222 is horizontal, is disposed at an angle (such as 90 degrees) to direction x, and preferably is in alignment with axis 214 and/or direction y.

The pier 102 may be injection-molded as a single piece from a thermoplastic polymer compound such as glass- or mineral-reinforced polypropylene. Flat surface 206 may be textured, or may be made up by a layer of a higher-friction material such as rubber or a thermoplastic elastomer (TPE).

Figure 2B:
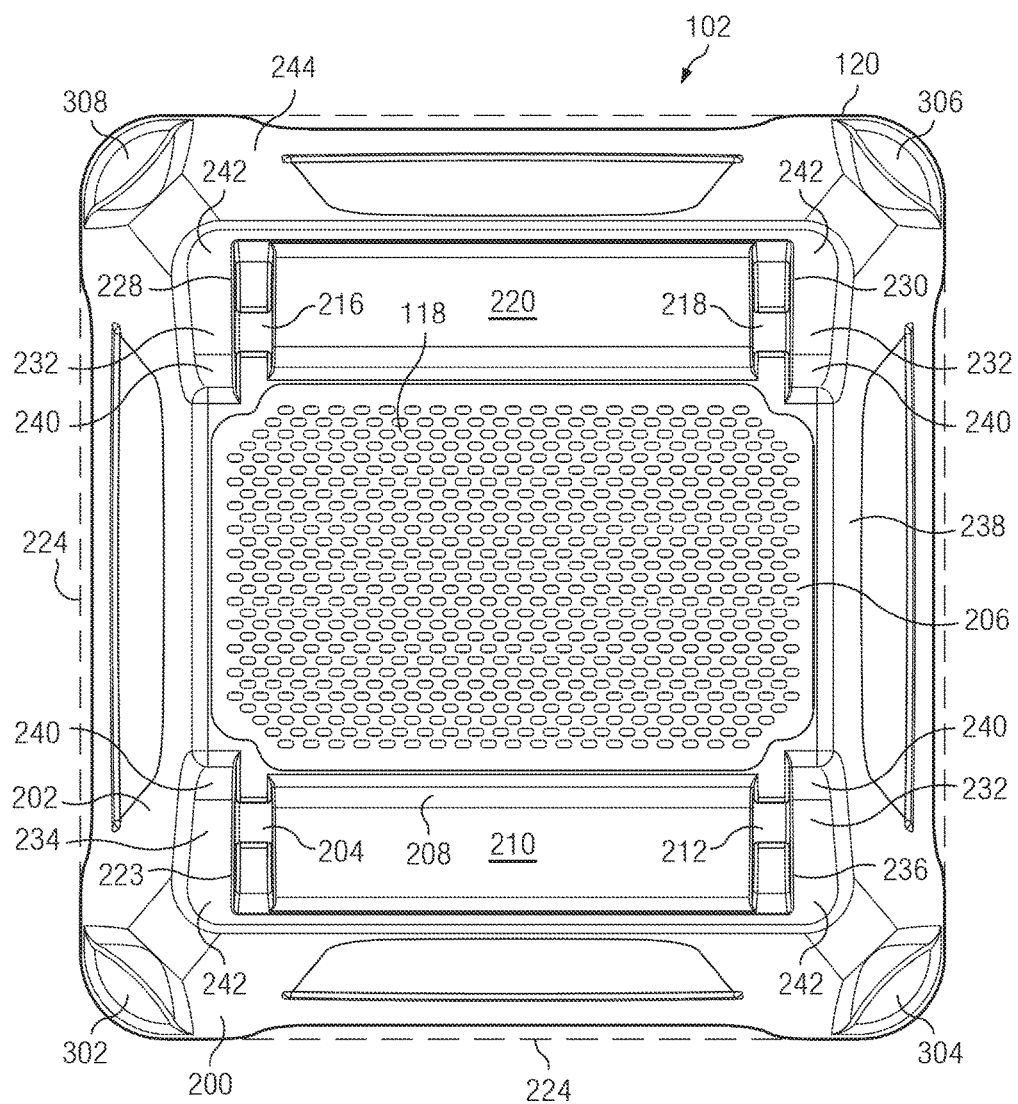
FIG. 2B is a top view of the pier.

The side walls 200, 202 (and front and right walls not visible in this view) may define separate legs as shown, or may instead be formed as a continuous, downwardly extending wall. The walls 200, 202 terminate at the base 120. As best seen in FIG. 2B, the base 120 defines a perimeter 224. The walls 200, 202, 238, 244 are outwardly splayed such that each axle receiver 204, 212, 216, 218 is inwardly displaced from perimeter 224 in an x direction, and each axle receiver 204, 212, 216, 218 is inwardly displaced or inboard from perimeter 224 in a y direction. This splaying or bracing of the pier base in both x and y directions greatly enhances the ability of the assembled system to resist shear forces as may be applied to the ramps 104, 106 or pier 102 by a dog or other cause. In one embodiment, the front and rear walls are splayed fore and aft by about 12 degrees, while the left and right walls are splayed in an outboard direction by about 10 degrees. This inboard and longitudinally inward disposition of the axle receivers 204, 212, 216, 218 makes for a very stable pier 102. The downward force from the weight of dog D on a ramp (such as ramp 104 as shown in FIG. 1) will transmit vertically at axle receiver bearing surfaces 714 (see, e.g., FIGS. 7D-7F). The positioning of base 120, and particularly legs 302-308, will cause an opposing pair of forces that make any rotational tipping moment be directed inwardly. Dog D's weight on ramp 104 therefore makes the pier 102 more stable.

As seen in FIGS. 2 and 2B, adjacent to and outboard each axle receiver 204, 212, 216, 218, a rail flange pocket 232 is formed in the top 118 of pier 102. Each rail flange pocket 232 is adapted to receive a curved rail flange (described below) that terminates, at its near end 110, a rail of a ramp 104 or 106 (described below). Each pocket 232 has a depth in they direction, between an outboard face 228, 230, 234, 236 of a respective receiver 204, 212, 216 or 218, and an adjacent pier side wall 202 or 238, that is at least as great as a thickness of a ramp rail it is meant to receive. Each pocket is formed by a concavely curved surface 240 that downwardly extends from top flat surface 206 and then transitions to a downwardly sloped surface 242, until rear wall 200 or front wall 244 is met.

Figure 3:
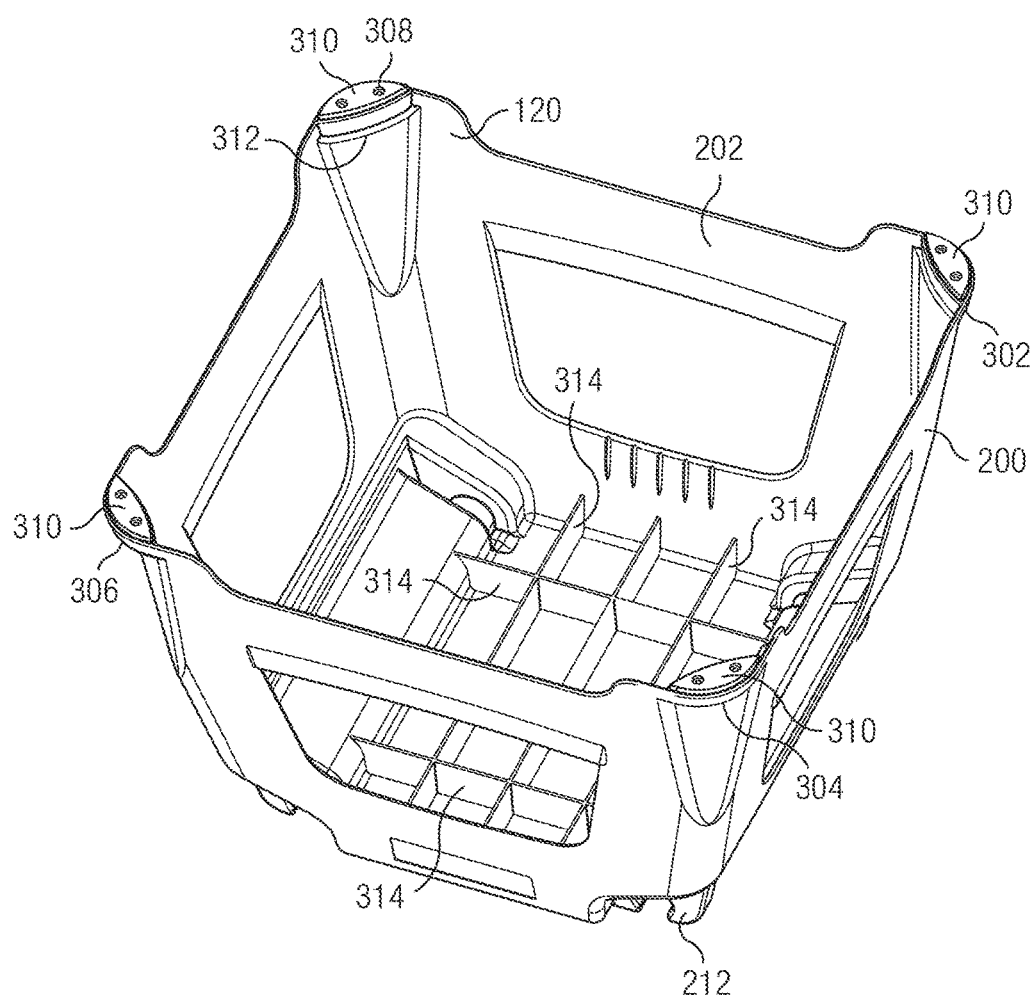
FIG. 3 is a perspective bottom view of the pier shown in FIG. 2.

As seen in FIG. 3, where base 120 is provided as discrete legs 302, 304, 306, 308, a rubber or TPE foot 310 may be attached as by screws to a horizontal foot wall 312 provided for this purpose in the bottom corner of each leg 302-308. The top 118 may be reinforced by intersecting ribs 314 as shown.

A representative ramp 104 is shown in more detail in FIG. 4; ramp 106 can be identical to ramp 104. FIG. 4A depicts a frame of reference used to describe ramp 104. Direction or axis a of ramp 104 is longitudinal and sometimes will be aligned with pier direction x. The ramp 104 is elongated in the a direction. Direction b is at right angles to direction a and is aligned with the width of the ramp 104. In use, direction b will be horizontal, in an inboard-outboard direction and typically will be aligned with direction y. Direction c is at right angles to directions a and b and is aligned with a thickness of the ramp 104. The abc directions or axes of ramp 104 will rotate in concert with the rotation of ramp 104 about its axle 114.

The ramp 104 has a tread panel 400. A top surface 401 of the tread panel 400 may be finished in a high-friction material such as rubber or TPE. Such a surface may be added as a separate layer that is insert-molded or bonded to the rest of the ramp 104 by in-mold labelling, may be applied by an adhesive or with screws, or may be sprayed on. Top surface 401 may be textured. The tread panel 400 may extend between spaced-apart left and right rails 402, 404; rails 402, 404 are thicker in a c direction than is tread panel 400 in order to stiffen the ramp 104 and to provide curbs for a dog traversing the ramp. An inboard-facing surface 406 of left rail 402 is spaced from an inboard-facing surface 408 of the right rail 404 by a predetermined width 410. This width is chosen to be greater than the width 226 separating the outboard-facing surfaces 228, 230; 234, 236 of respective axle receivers 204, 212 or 216, 218. In this way, the pairs of receivers 204, 212; 216, 218 will engage the axle 114 at locations that are inboard of the inboard-facing rail surfaces 406, 408.

A bottom of the ramp 104 is seen in FIG. 5. A gripping foot 122 may be formed of TPE or rubber and may be affixed as by screws to rail 404 at end 112. Similarly, a gripping foot 122 may be affixed to rail 402 at end 112. Each gripping foot 122 may have a nose piece 499 that extends to cover a distal surface of far end 112. A main ramp body 500 may be injection-molded from a thermoplastic polymer compound such as glass- or mineral-reinforced polypropylene and may be provided on its bottom surface with intersecting reinforcing ribs 502, as shown.

Figure 6A:
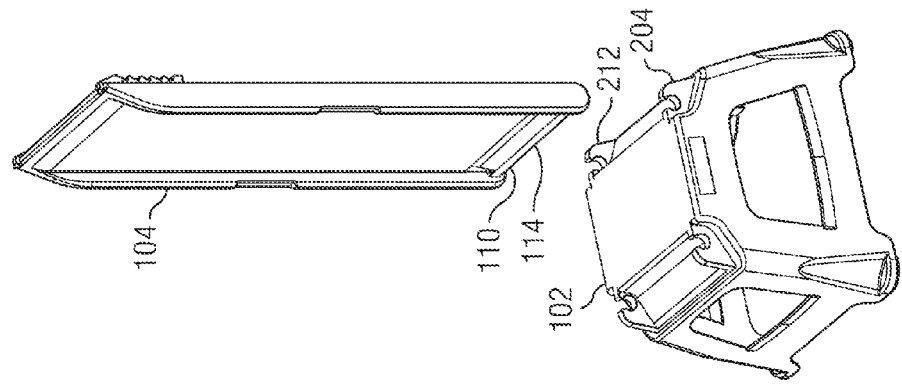
FIGS. 6A-6D are views showing stages of assembly of a ramp to a pier.
Figure 6B:
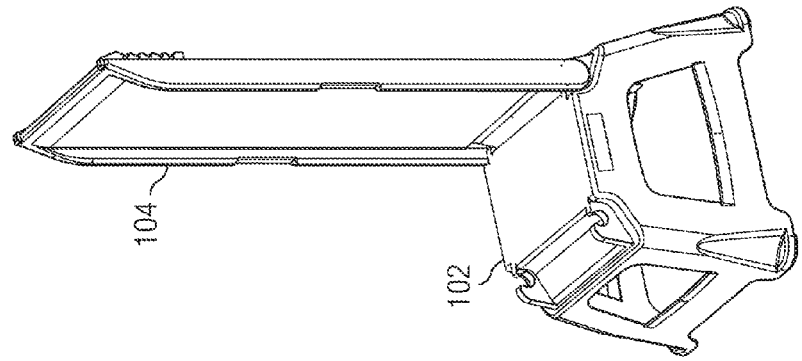
Figure 6C:
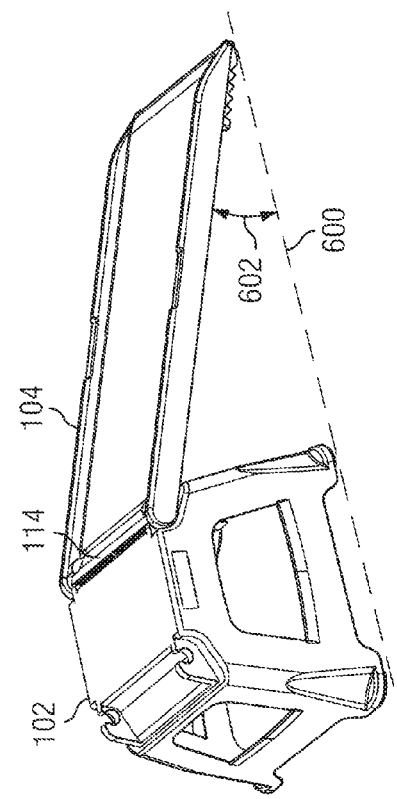
Figure 6D:
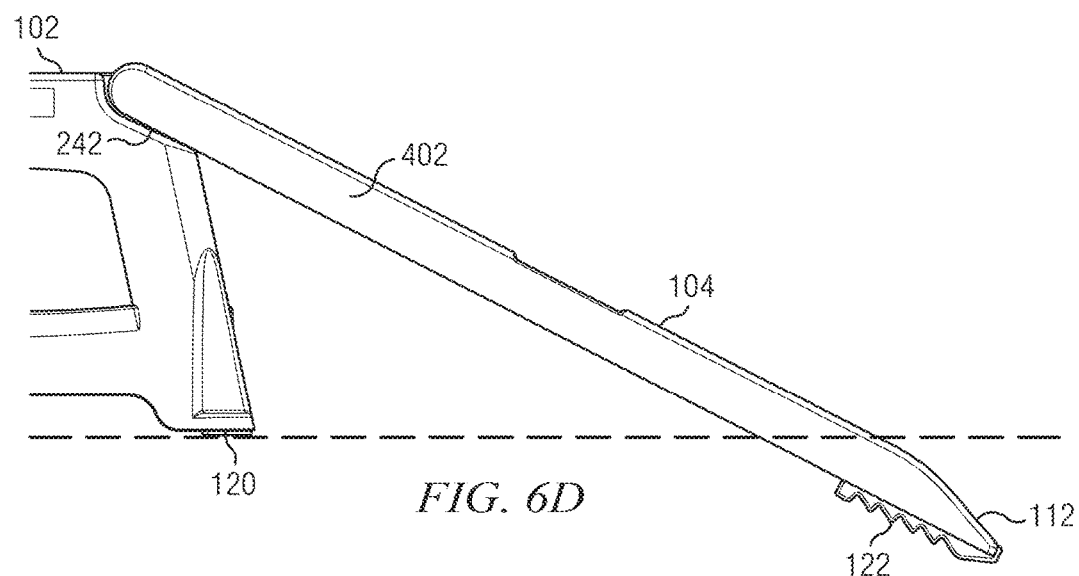

FIGS. 6A-6C show successive steps in assembling a ramp 104 to the central pier 102. The ramp 104 is held (FIG. 6A) in a vertical position over axle receivers 204 and 212, with ramp near end 110 down. In this position, the a direction of the ramp 104 is aligned with the z direction or vertical axis of pier 102. Then (FIG. 6B) the ramp 104 is lowered until the axle 114 is received within the receivers 204 and 212. Finally (FIG. 6C) the ramp 104 is downwardly rotated around axle 114 to its use position. Ramp 106 (not shown) is installed similarly.

FIG. 6C shows pier 102 and ramp 104 deployed on a horizontal surface 600. In one embodiment, an angle 602 of ramp 104 with the horizontal surface 600 may be as little as 19 degrees. FIG. 6D shows the configuration of assembled pier 102 and ramp 104 as they are deployed on a downwardly sloped surface. The relief accorded by downward slope 210 and pocket surfaces 242 permit ramp 104 to make a downward angle of as much as 27 degrees, and to contact the ground at a position as much as 5.3 inches below the elevation of base 120.

Figures 7A, 7B:
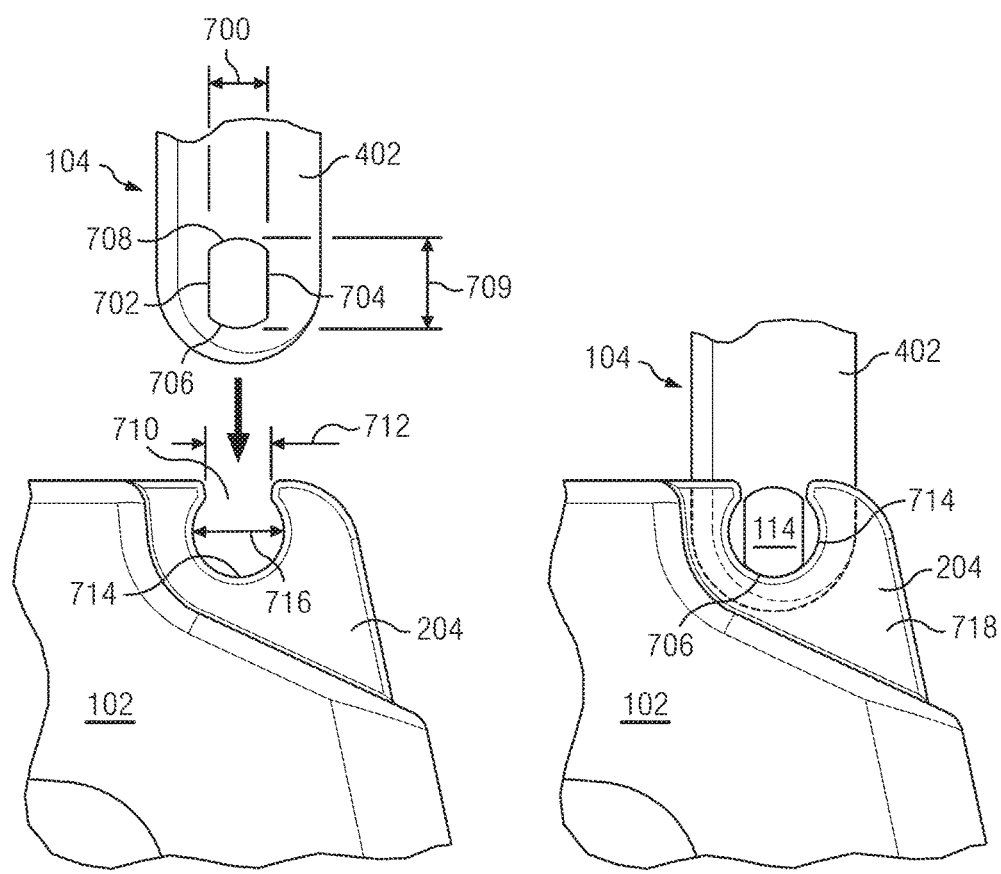
FIGS. 7A-7F are side details showing the assembly together of, and the articulation after assembly of, a ramp axle and a pier axle receiver.

FIGS. 7A-7F are schematic details of ramp 104 as it is being installed in right rear receiver 204 of the pier 102, and as it can be articulated around rear axis 214 once it has been installed. As seen in FIG. 7A, the axle 114 has a dimension 700 in the c direction. Dimension or thickness 700, in this embodiment, is taken between two opposed flat surfaces 702 and 704 of the axle 114. The flats 702 and 704 may be parallel to each other and have their ends joined by opposed convex arcuate segments 706 and 708, which may be cylindrical around axis 214 (see FIG. 7D). A diameter between arcuate segments 706 and 708 has a predetermined thickness or diameter 709. The axle receiver 204 has an upwardly facing opening or slot 710 with a predetermined width 712 in the x direction. Width 712 is larger than thickness 700 but is smaller than diameter 709. A curved surface 714, which may conform to a cylinder formed around axis 214, downwardly and inwardly extends from opening 710 to form a bearing surface for the axle 114. Surface 714 may have a diameter 716 that is slightly larger than axle diameter 709.

Figure 7C:
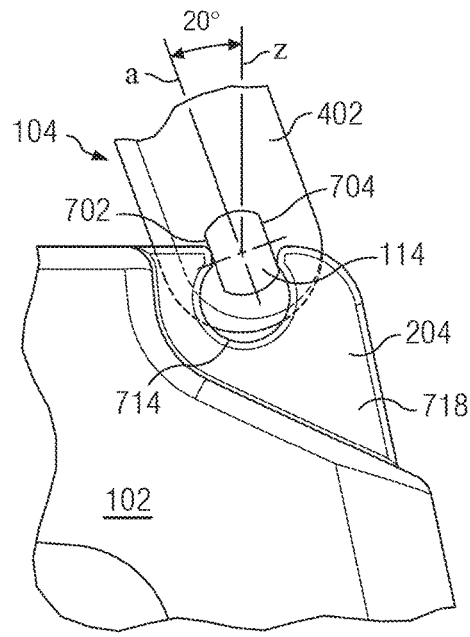

When direction a of the ramp 104 is aligned with direction z of the pier 102, the user will be able to insert the axle 114 into the receiver 204, as shown in FIG. 7B. The orientation of the ramp 104 may be at somewhat of an angle to direction z, and insertion will still be possible. For example, direction a of the ramp 104 may be as much as 20 degrees canted from direction z and insertion will still be possible. This is shown in FIG. 7C. This is to make assembly relatively easy on the part of the user. But, if the ramp 104 is at a more substantial angle to direction z than this, the ramp axle 114 will not be able to be inserted into receiver 204. This is because the general diameter 709 across the non-flat portion of axle 114 is larger than receiver opening width 712.

In FIG. 7B, ramp axle 114 has been successfully inserted into axle receiver 204. Note that the ramp rail 402 is outboard from the outboard surface 718 of the receiver 204. Cylindrical segment 706 comes into contact with cylindrical bearing surface 714.

Figure 7D:
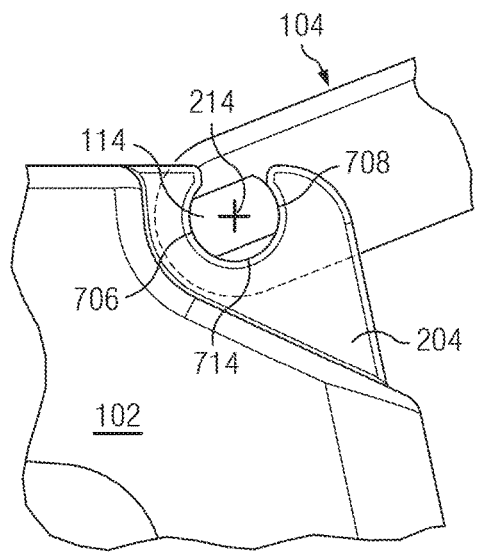
Figure 7E:
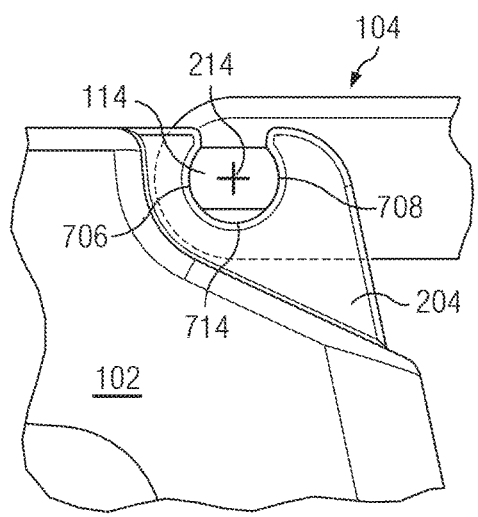

In FIG. 7D, the ramp 104 has been rotated around axis 214 to a position that it would take if it were being used as a forward ramp into vehicle V. The curved surfaces 706, 708 of the axle 114 slidably engage with the bearing surface 714 of the axle receiver 204. FIG. 7E shows the orientation of ramp 104 to pier 102 when ramp 104 is held to be horizontal.

Figure 7F:
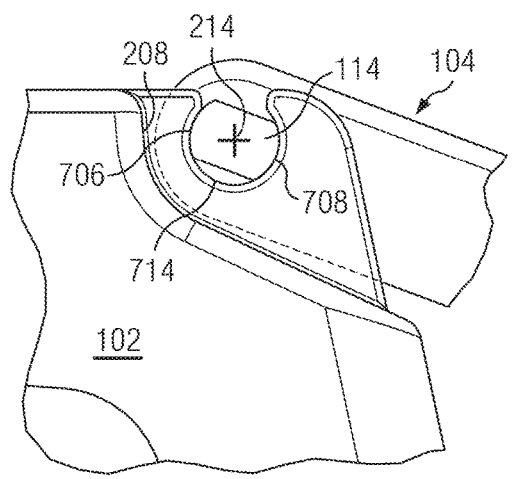

FIG. 7F shows the position of ramp axle 114 relative to axle receiver 204 when ramp 104 is in a position it might assume if its far end 112 were placed on the ground. In any of the positions shown in FIGS. 7D-7F, the ramp axle 114 cannot be pulled out of the receiver 204.

Figure 8:
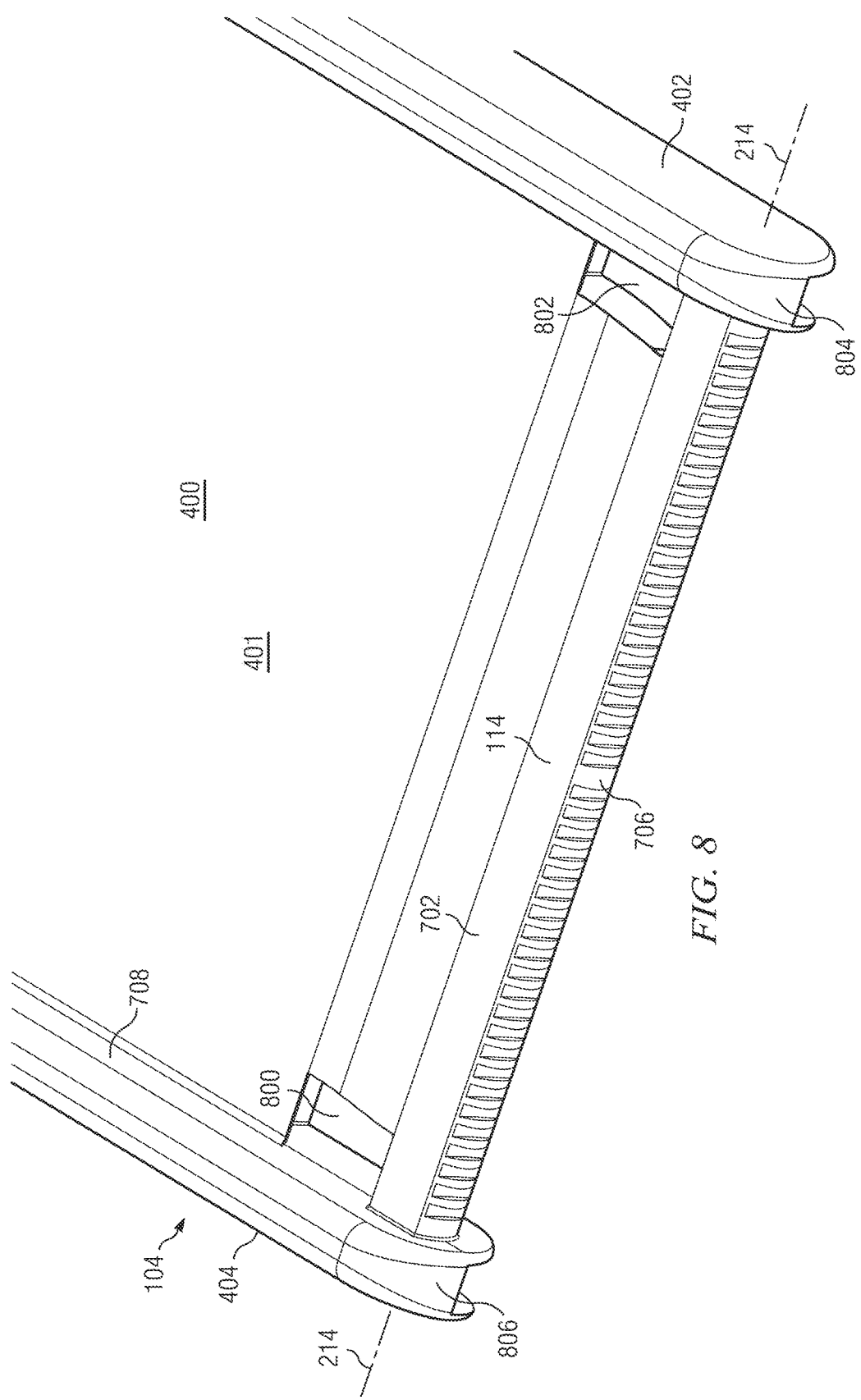
FIG. 8 is a top perspective detail of a near end of the ramp illustrated in FIG. 4, showing details of a ramp axle.
Figure 10:
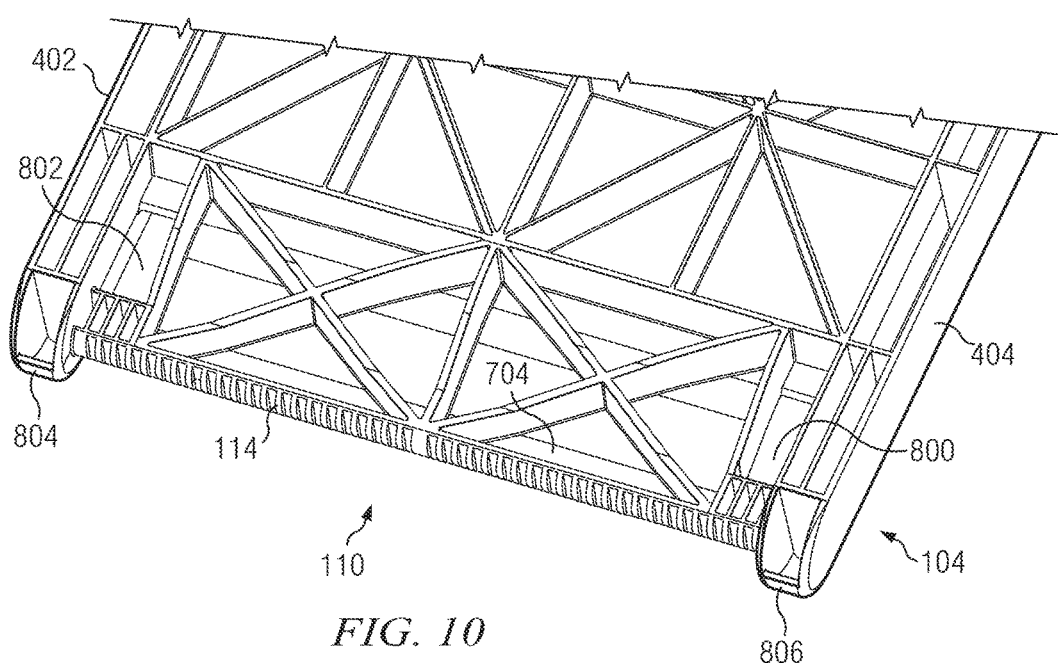
FIG. 10 is a bottom perspective detail view of the near end of the ramp illustrated in FIG. 4.
Figure 11:
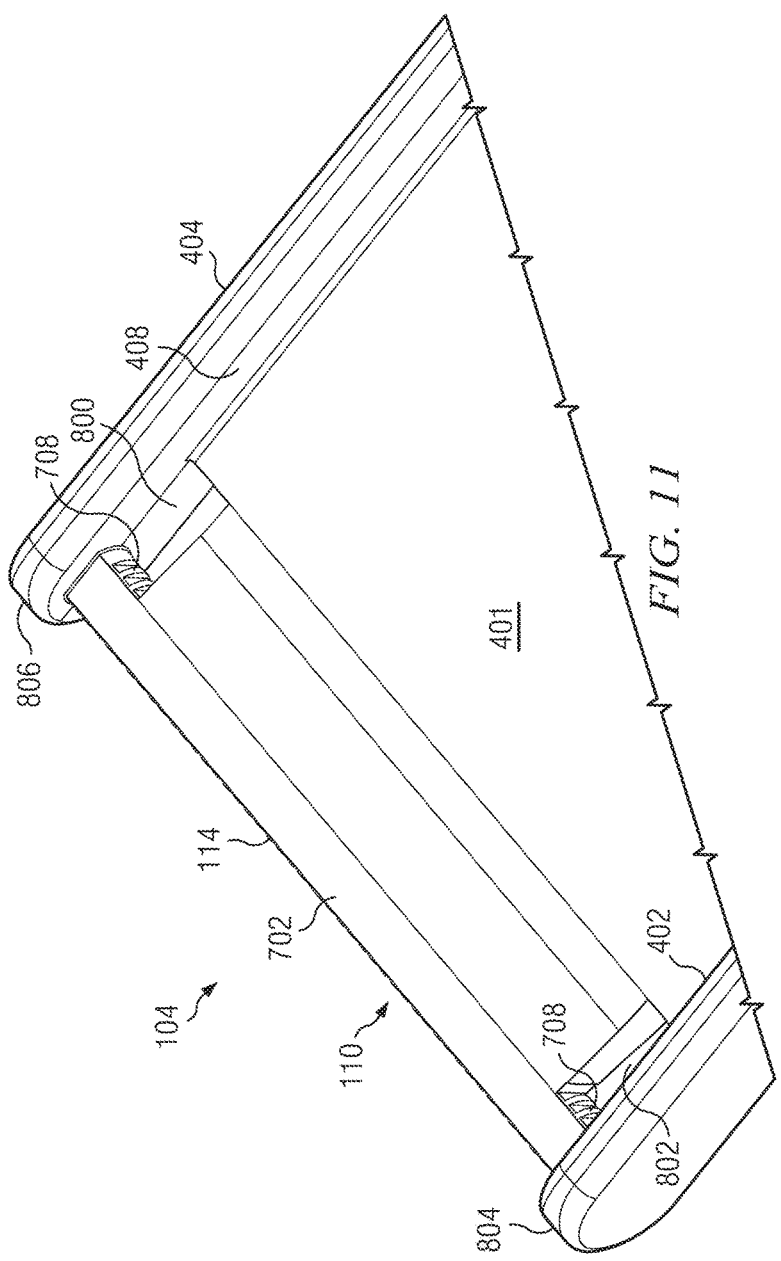
FIG. 11 is a further top perspective view of the near end of a ramp according to the invention, the view taken from an angle different from the angle of view of FIG. 8.

FIGS. 8, 10 and 11 show top and bottom details of a near end 110 of ramp 104 (ramp 106 being identical). A front curved surface 706 of the axle 114 is not continuous but rather is composed of multiple parallel walls that have been cored out for better moldability. Curved segment 706 and upper flat 702 are shown to be generally of the same shape across the entire length in a b direction of axle 114, but this could be otherwise; segments 706, 708 and flats 702, 704 need only occur at those positions where there are axle receivers. For this reason, the single axle 114 could be replaced with separated right and left axles on the same axis 214. In the illustrated embodiment, a right slot 800 is positioned and dimensioned to receive the receiver 212 (or 216), and a left slot 802 is positioned and dimensioned to receive the left receiver 204 (or 218). The curved segments 706, 708 and flats 702, 704 need only extend for the widths of receivers 204, 212 (or 216, 218) and otherwise the axle 114 can take any convenient shape. Flat 702 may be substantially coplanar with top surface 401 of ramp tread panel 400.

Rail 402 terminates at its forward (near) end with a convexly curved flange or surface 804, and similarly, rail 404 terminates at its forward or near end with a convexly curved flange or surface 806. Surfaces 804, 806 may be formed as cylindrical surfaces around axis 214. Their radii of curvature are greater than that for arcuate axle segment 706, but less than that of the curved surfaces 240 of the rail flange pockets 232 (FIG. 2B).

Figure 9:
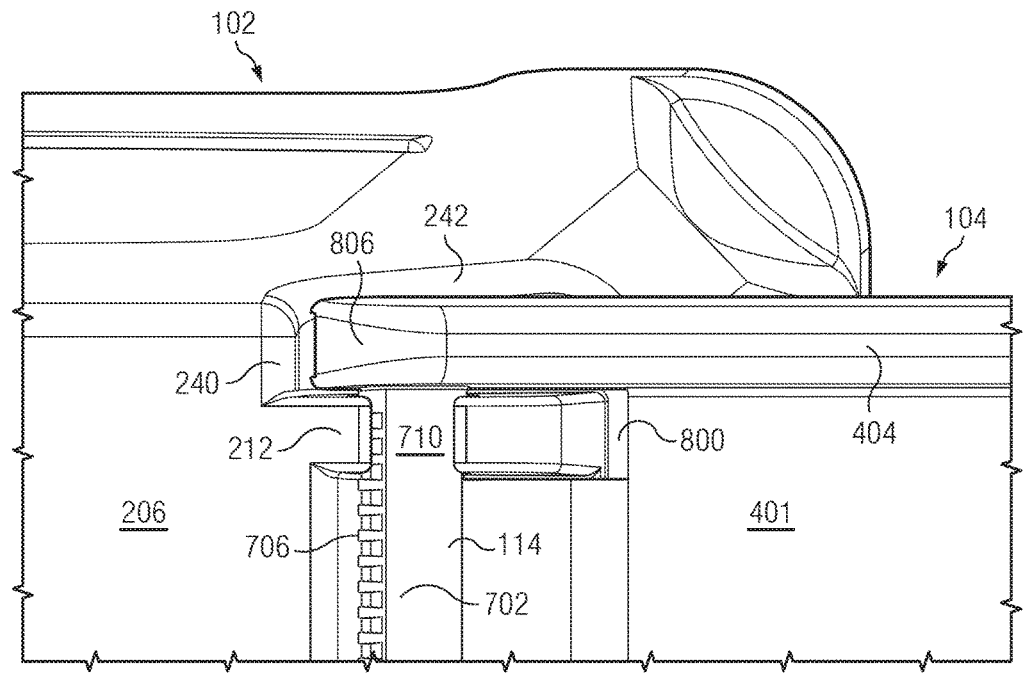
FIG. 9 is a detail from the top of a ramp axle as assembled to a pier axle receiver.

FIG. 9 is a representative top detail showing a ramp 104 as received into rear right receiver 212. In the illustrated position, ramp 104 is sloping downward toward the ground from pier 102. In this or in a horizontal position, the axle 114 of ramp 104 may not be pulled or lifted out of the receiver 212, as the opening 710 is not wide enough. Where pier 104 is held to a horizontal position, upper flat 702 may be substantially coplanar with top surface 206 of the pier 102. A width, in a y direction, of pocket surfaces 240 and 242 is at least as great as a width, in a b direction, of rails 402 or 404.

Figure 12:
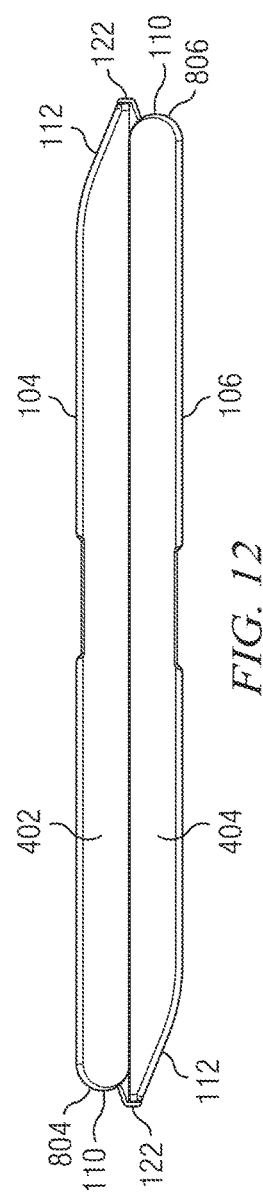
FIG. 12 is a side view of two ramps, shown assembled back-to-back for storage.

FIG. 12 shows how ramps 104 may be fitted together for storage. Ramps 104, 106 are fitted back-to-back such that the far end 112 of ramp 106 is mated to the near end 110 of ramp 104, and vice versa. As seen in FIG. 5, each gripping foot 122 has a downwardly protruding portion 504 that may include several triangular teeth 506. The surface 504 downwardly extends beyond a plane in which lower margins 508, 510 of inboard and outboard rail walls 512, 514 reside. At the near end 110 of the ramp 104 or 106, rail walls 512, 514 form, with truncated cross walls 516, a pocket 518 for receiving gripping foot surface 504. The cross walls 516 of one ramp may be shortened to make room for protruding portions 504 of the feet 122 of the other ramp. Pockets 518 on one of the ramps are sized to completely receive protruding portions 504 of the gripping feet 122 on the other end of the ramps, fitting the ramps 104, 106 together.

In summary, a pet ramp system has been described and illustrated that exhibits improved stiffness, load capability and torsional stability while permitting easier access by pets to vehicles. The modular system may be easily assembled and disassembled but will not separate into its components during use.

While illustrated embodiments of the present invention have been described and illustrated in the appended drawings, the present invention is not limited thereto but only by the scope and spirit of the appended claims.

We claim:

1. A pet ramp system for providing a pathway for a pet into a cargo area of a vehicle, the cargo area elevated above the ground, the pet ramp system comprising:

a ramp having a near end, a far end of the ramp spaced from the near end by a length along an a axis of the ramp, an axle of the ramp disposed at the near end and formed around a b axis that is perpendicular to the a axis, a first thickness of the axle in a c direction at right angles to the a axis and the b axis being less than a second thickness of the axle taken in a direction parallel to the a axis, the axle having an outer surface formed parallel to the b axis; and a pier having a base for placement on the ground, the pier having a length in an x direction, a width in a y direction at right angles to the x direction, and a height in a z direction at right angles to the x and y directions, a top of the pier upwardly displaced from the base in the z direction;

at least one axle receiver formed near the top of the pier, the at least one axle receiver being an axle receiver that has:

a center, a cylindrical bearing surface formed around the center and around a first receiver axis parallel to the y direction; and an upwardly facing opening in the cylindrical bearing surface, the upwardly facing opening being upwardly spaced from the center of the axle receiver, a second receiver axis of the axle receiver being parallel to the z direction and passing through the center of the axle receiver and the upwardly facing opening, a width of the upwardly facing opening in the x direction being greater than the first thickness of the axle of the ramp, the ramp adapted to be assembled to the axle receiver by being oriented such that the a axis of the ramp is positioned at an insertion angle with respect to the second axis of the axle receiver, the insertion angle selected from a plurality of angles relative to the second receiver that are each less than a predetermined angle, the predetermined angle being greater than zero, the axle of the ramp then passing through the upwardly facing opening of the axle receiver and received on the cylindrical bearing surface of the axle receiver;

after insertion the ramp being lowered to any of a plurality of use positions in which the a axis of the ramp forms an angle with the second receiver axis that is greater than the predetermined angle, the axle receiver preventing separation of the axle of the ramp from the axle receiver when the ramp is oriented to any of the plurality of use positions, the far end of the ramp being elevated above the top of the pier in the z direction in a first of the use positions, the far end of the ramp being downwardly displaced from the top of the pier in the z direction in a second of the use positions; wherein the top of the pier has a pier flat surface, the first receiver axis being downwardly displaced in a z direction from the pier flat surface; and wherein the axle of the ramp has an outer surface parallel to the b axis of the axle, an upper flat of the outer surface parallel to the a axis of the ramp and an upper surface of the ramp.

2. The system of claim 1, wherein the predetermined angle is 20 degrees.

3. The system of claim 1, wherein a shape of the axle has the upper flat and an opposed flat in planes parallel to the a axis of the ramp, and opposed convexly curved segments connecting together the flats.

4. The system of claim 3, wherein each of the flats is formed in the outer surface of the axle, the flats including the upper flat, the upper flat of the axle of the ramp being substantially coplanar with the pier flat surface when the axle is assembled to the axle receiver of the pier and the ramp is disposed such that the a axis of the ramp is parallel to the x direction of the pier.

5. The system of claim 1, wherein a diameter of the cylindrical bearing surface is greater than the first thickness of the axle of the ramp.

6. The system of claim 1, wherein the upper flat is spaced from the b axis of the axle by a predetermined distance, a displacement of the b axis from the pier flat surface in a z direction being substantially similar to the predetermined distance when the ramp is assembled to the axle receiver.

7. A pet ramp system for assisting a pet into a cargo area of a vehicle, the cargo area elevated above the ground, the pet ramp system comprising:
  first and second ramps, each of the first and second ramps being a ramp that has:
  a near end, a far end of the ramp spaced from the near end by a length along an a axis of the ramp, an axle of the ramp disposed at the near end and formed around a b axis that is perpendicular to the a axis, a first thickness of the axle of the ramp taken in a c direction that is perpendicular to the a axis and the b axis being less than a second thickness of the axle taken in a direction parallel to the a axis; and
  the pet ramp system further comprising a pier, the pier having a base for placement on the ground, the pier having a length in an x direction, a width in a y direction perpendicular to the x direction, and a height in a z direction that is perpendicular to the x and y directions, a top of the pier upwardly displaced from the base of the pier in the z direction;
  at least one first axle receiver formed near the top of the pier, at least one second axle receiver formed near the top of the pier and to be spaced from the at least one first axle receiver in the x direction, each of the at least one first axle receiver and the at least one second axle receiver being an axle receiver that has:
  a center, a cylindrical bearing surface formed around the center and around a first receiver axis parallel to the y direction; and
  an upwardly facing opening in the cylindrical bearing surface, the upwardly facing opening being upwardly spaced from the center of the axle receiver, a second receiver axis of the axle receiver being parallel to the z direction and passing through the center of the axle receiver and the upwardly facing opening, a width of the upwardly facing opening in the x direction being greater than the first thickness of the axle of the ramp;
  either of the at least one first ramp and the at least one second ramp adapted to being an inserted ramp that is assembled to either the at least one first axle receiver or the at least one second axle receiver, the at least one first axle receiver or the at least one second axle receiver to which the inserted ramp is assembled then being a receiving axle receiver, such that in order to assemble the inserted ramp to the receiving axle receiver, the inserted ramp is oriented such that the a axis of the inserted ramp is positioned at an insertion angle relative to the second receiver axis of the receiving axle receiver, the insertion angle chosen from any of a plurality of angles relative to the second receiver axis of the receiving receiver that are each less than a predetermined angle, the predetermined angle being greater than zero, the axle of the inserted ramp then passing through the upwardly facing opening of the receiving axle receiver to be received on the bearing surface of the receiving axle receiver;
  the inserted ramp then being lowered to any of a plurality of use positions, in any of the use positions the a axis of the inserted ramp forming an angle with the second receiver axis of the receiving axle receiver which is greater than the predetermined angle, the inserted ramp being incapable of being separated from the pier when oriented in any of the plurality of use positions;
  in a first one of the plurality of use positions, the far end of the inserted ramp being elevated in a z direction above the top of the pier, in a second one of the plurality of use positions, the far end of the inserted ramp being displaced in a z direction below the top of the pier;
  wherein the top of the pier has a pier flat surface, the first receiver axis being downwardly displaced in the z direction from the pier flat surface; and wherein the axle of the ramp has an outer surface formed in parallel to the b axis, an upper flat of the outer surface spaced from the b axis by a predetermined distance and parallel to an upper surface of the ramp.

8. The pet ramp system of claim 7, wherein the predetermined angle is 20 degrees.

9. The pet ramp system of claim 7, wherein a shape of the axle of the ramp has the upper flat and an opposed flat parallel to the a axis of the ramp, and opposed convexly curved segments connecting together the two opposed flats.

10. The pet ramp system of claim 9, wherein each of the two opposed flats is formed in the outer surface of the axle of the ramp, the two opposed flats including the upper flat, an upper surface of the axle of the ramp being substantially coplanar with the pier flat surface when the ramp is the inserted ramp that has been received in the receiving axle receiver and the inserted ramp has been lowered to a horizontal one of the plurality of use positions, such that the a axis of the inserted ramp is then parallel to the x direction of the pier.

11. The pet ramp system of claim 7, wherein the diameter of the cylindrical bearing surface of the axle receiver is greater than the first thickness of the axle of the ramp.

12. The pet ramp system of claim 7, wherein, a displacement of the b axis from the pier flat surface in a z direction is substantially similar to the predetermined distance when the ramp is an inserted ramp that has been assembled to a receiving axle receiver.

\* \* \* \* \*